Figure 1:
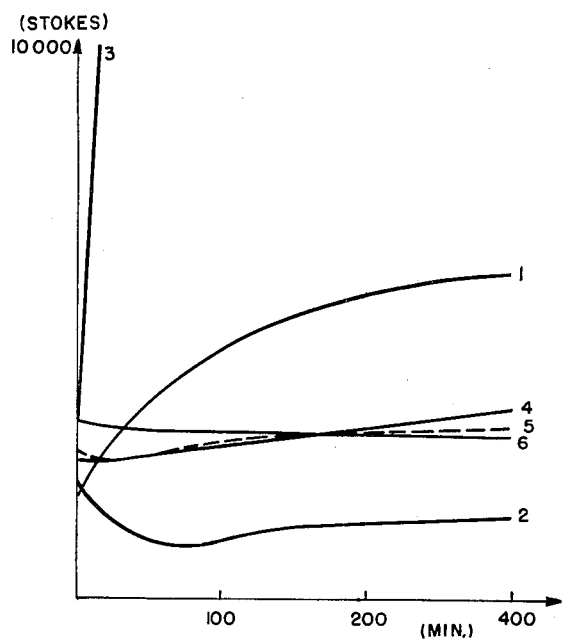

INVENTORS:
GERHARD ILLING
ERICH SCHWARTZ
FRIEDRICH MERTES

United States Patent Office 3,228,898
Patented Jan. 11, 1966

3,228,898
POLYAMIDES STABILIZED WITH INORGANIC PHOSPHOROUS ACIDS, FATTY ACIDS OR THE METALLIC SALTS THEREOF
Gerhard Illing, Neuleiningen (Pfalz), Erich Schwartz, Mannheim, and Friedrich Mertes, Ludwigshafen (Rhine), Gartenstadt, all of Germany, assignors to Badische Anilin- & Soda-Fabrik Aktiengesellschaft, Ludwigshafen (Rhine), Germany
Filed Oct. 3, 1961, Ser. No. 142,622
Claims priority, application Germany, Oct. 6, 1960, B 59,650
2 Claims. (Cl. 260—18)

The present invention relates to the stabilization of the melt viscosity of polyamides to be shaped without cutting.

It is known that the degree of polymerization and the melt viscosity of polyamides change when the polyamides are kept in a molten condition for prolonged periods. This phenomenon has an extremely disadvantageous effect in the shaping of polyamides without cutting. For example, in the production of large shaped articles by injection molding, it is necessary to adapt the processing conditions as regards pressure and temperature to the changing melt viscosity. Otherwise brittle moldings are obtained which have bubbles and internal stresses. Since, in some cases, polyamides remain in the molten state for several hours while being processed by injection molding, it is of great importance that their melt viscosity should remain as constant as possible during this period.

The object of the invention is to produce polyamides whose viscosity in the molten state remains as constant as possible during prolonged periods and whose melt viscosity is practically constant for several hours.

The object of the invention is achieved by adding to polyamides, prior to molding or extrusion, 0.001 to 1% by weight of an acid of phosphorus or a metal salt thereof and 0.01 to 2% by weight of an alkanemonocarboxylic or alkanedicarboxylic acid, or a salt thereof with a metal of groups I and II of the periodic system of elements.

It is known to use fatty acid salts of alkaline earth or earth metals as lubricants for polyamides which are to be molded. These additions serve to increase the flowability of the polyamides. It is further known to add to polyamides acids of phosphorus or salts thereof to increase the stability of the polyamides to the action of light, heat or oxygen. The melt viscosity of polyamides is not stabilized by the addition of fatty acid salts of alkaline earth or earth metals or of acids of phosphorus or salts thereof. In certain circumstances, the melt viscosity of polyamides which contain a compound from one or other of these groups undergoes even greater changes than that of polyamides without any addition. It is only by combining a compound from each of the two groups that the desired effect is achieved.

Attempts have been made to prepare polyamides with a constant degree of polymerization by adding lower fatty acids, such as acetic acid, to polyamide-forming compounds. A certain stabilization of the melt viscosity is thereby achieved, but in many cases it is insufficient for the purposes of processing by molding or extrusion.

For the stabilization of the melt viscosity according to this invention, oxyacids of phosphorus of any degree of oxidation are suitable, for example hypophosphorous acid, phosphorous acid, hypodiphosphoric acid, orthophosphoric acid, pyrophosphoric acid, hexametaphosphoric acid or higher polyphosphoric acids (metaphosphoric acid). Metal salts of these acids, especially alkali or alkaline earth metal salts, or salts of other metals, such as iron, manganese or thorium, are also suitable. Reducing phosphorus acids, for example phosphorous acid, or alkali or alkaline earth metal salts of reducing phosphorus acids, are especially effective.

Of the alkanecarboxylic acids and alkanedicarboxylic acids, the higher acids with 10 to 22 carbon atoms, such as capric acid, palmitic acid, stearic acid, behenic acid, undecanedicarboxylic acid or 1-nonyl-octane dicarboxylic acid, are especially suitable. A stabilizing effect is also achieved with lower monocarboxylic acids or dicarboxylic acids, such as acetic acid, caproic acid, oenanthic acid, succinic acid or adipic acid. The alkanemonocarboxylic or alkanedicarboxylic acids may also be used in the form of their salts with metals of Groups I or II of the periodic system of elements, for example, as calcium, barium, zinc, sodium or potassium salts. Alkaline earth metal salts of higher alkanemonocarboxylic or alkanedicarboxylic acids are especially suitable.

The viscosity-stabilizing effect of the additives according to this invention also depends, to a certain extent, on the ratio of the phosphorus acid component to the carboxylic acid component. The ratio with the greatest effectiveness differs somewhat with different combinations. In general, somewhat smaller amounts by weight of the phosphorus acid component may be used than of the carboxylic acid component. In the case of a phosphorus acid salt and a stearic acid salt, the weight ratio of 1:2 to 1:10 may suitably be used. The ratio with the best activity in any given case can easily be ascertained by determining the viscosity behavior of the polyamides in dependence on the ratio of the components added.

As a rule, an intimate mixture is first prepared from the additives according to this invention and the polyamides, for example by kneading, and this ready-made mixture then shaped, for example, molded or extruded. When shaping by means of screw machines, for example, extruders or injection molding machines, the additives may also be incorporated with the polyamides during processing.

The additives according to this invention are suitable for stabilizing the melt viscosity of synthetic linear polyamides, i.e., polymers of ω-aminocarboxylic acids, lactams or diamine dicarboxylates, whose molecular chains have CONH groups at regular intervals, for example polycaprolactam, polycaprylic lactam, polylauric lactam, polyhexamethylene adipamide or polyoctamethylene sebacamide. They may also be successfully used with polyurethanes and polyureas. The polyamides may also contain the usual additives, such as brightening agents, stabilizers against the action of heat and light, lubricants, fillers or dyes. Polyamides with stabilized viscosity may be advantageously processed in plunger-type injection molding machines or screw injection molding machines to shaped articles of any kind. They are also especially suitable for the production of threads for tire cord by extrusion or as polyamide casting resins.

The invention is illustrated by, but not limited to, the following examples in which the parts and percentages are by weight.

EXAMPLE 1

1000 parts of polycaprolactam (K-value 72.3, melting range 210° to 215° C., density 1.12 g./cc.) is mixed with 5 parts of calcium stearate, 2 parts of disodium hydrogen phosphite pentahydrate and 2 parts of di-tert-butyl-p-cresol and the mixture kneaded in a screw extruder at 250° to 260° C. for 30 to 60 seconds, then extruded through a strainer plate, cooled and comminuted. A pale, opaque polyamide is obtained which after drying in a stream of nitrogen has a K-value of 73.4 and a water content of 0.06%.

The melt viscosity of this fused polyamide heated to

250° C., plotted against time is represented by curve 4 in FIGURE 1 of the accompanying drawings as compared with polycaprolactam without any addition (curve 1), polycaprolactam with 0.5% of calcium stearate (curve 2) and polycaprolactam with 0.2% of disodium hydrogen phosphite (curve 3).

From the curves it will be seen that without any addition and with an addition of 0.2% of disodium hydrogen phosphite (curves 1 and 3), the melt viscosity rises considerably and thus makes processing by injection molding more difficult. The addition of calcium stearate effects a noticeable decline in the melt viscosity (curve 2) and this results in the polycaprolactam becoming brittle. In both cases, especially when making large injection moldings, the working pressure and the temperature must be adapted to the changing melt viscosity. With the additive according to this invention, the melt viscosity remains practically constant (curve 4). This polyamide has considerably improved processability in injection molding.

The viscosity is stabilized in the same way by adding 0.3% of thorium hypophosphite ($ThP_2O_6$) and 0.5% of calcium stearate (curve 5) or of 0.5% of heptadecane-dicarboxylic acid calcium salt and 0.1% of disodium hydrogen phosphite (curve 6).

The improved processability is also demonstrated by the following injection molding cycle periods in the production of a shaped article weighing 24 grams made from caprolactam containing the above-mentioned additions on a piston injection molding machine.

*Injection molding cycle periods*

[Production of a molding weighing 24 grams on a plunger-type injection molding machine]

| Polycaprolactam according to curve— | | | | | | Temperature, °C. |
|---|---|---|---|---|---|---|
| 1 | 2 | 3 | 4 | 5 | 6 | |
|  |  |  | 84″ | 80″ | 78″ | 195 |
|  | 88″ |  | 46″ | 45″ | 44″ | 205 |
| 86″ | 70″ |  | 32″ | 32″ | 31″ | 210 |
| 81″ | 50″ | 88″ | 22″ | 21″ | 20″ | 215 |

EXAMPLE 2

1000 parts of polycaprylic lactam (K-value 76.2, softening range 198° to 203° C.) is intensely premixed with 5 parts of calcium stearate and 2 parts of disodium hydrogen phosphite and the mixture homogenized for 25 to 40 seconds in a double-shaft disc kneader at 260° to 280° C. A pale opaque stabilized polycaprylic lactam is obtained which after drying has a water content of 0.08% and a K-value of 76.1.

Figure 2:
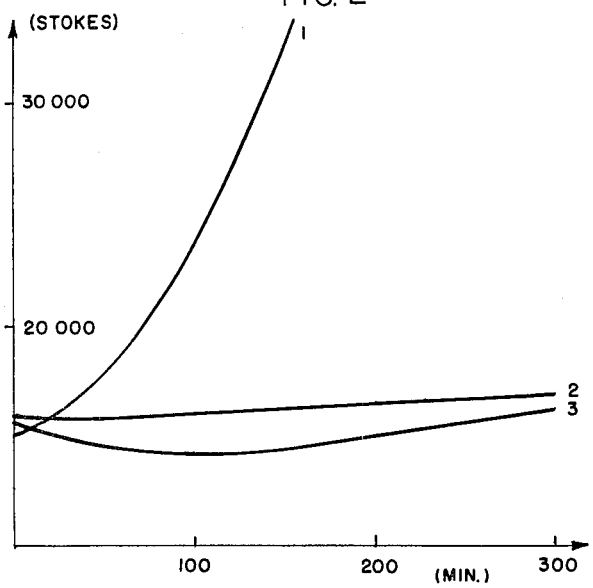

The melt viscosity of this polyamide, plotted against time and measured at 230° C., is shown by curve 2 in FIGURE 2 of the accompanying drawings. The behavior of unstabilized polycaprylic lactam is shown by curve 1. The melt viscosity of polycaprylic lactam which contains another addition according to the invention of 0.5% of zinc stearate and 0.2% of disodium hydrogen phosphite, proceeds according to curve 3.

EXAMPLE 3

Figure 3:
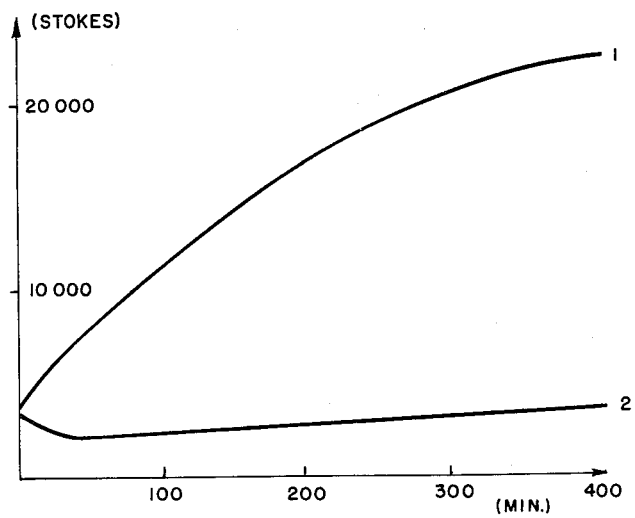

An intimate mixture is prepared in the way described in Example 1 from 1000 parts of polyhexamethylene sebacamide (K-value 69, softening range 210° to 215° C.), 5 parts of calcium stearate and 1 part of disodium hydrogen phosphite. The melt viscosity is represented by curve 2 in FIGURE 3 of the accompany drawings as compared with the same polyamide without any addition (curve 1).

We claim:

1. A synthetic linear polyamide having molecular chains with repeating —CONH— groups at regular intervals, in which polyamide is dispersed, as melt viscosity stabilizers, 0.001% to 1% by weight, based on said polyamide, of a phosphorus compound selected from the group consisting of hypophosphorous acid, phosphorous acid, hypodiphosphoric acid, orthophosphoric acid, pyrophosphoric acid, hexametaphosphoric acid, and metaphosphoric acid and metal salts of said acids and 0.1% to 2% by weight, based on said polyamide, an organic carboxylic compound selected from the group consisting of alkanemonocarboxylic acids and salts of said carboxylic acids with a metal from Groups I and II of the periodic system of elements, with the further proviso that the quantity of said phosphorus compound is less than the quantity of said organic carboxylic compound.

2. A synthetic linear polyamide having molecular chains with repeating —CONH— groups at regular intervals, in which polyamide is dispersed, as melt viscosity stabilizers, 0.001% to 1% by weight, based on said polyamide, of an alkali metal salt of phosphorous acid and 0.1% to 2% by weight, based on said polyamide, of an alkaline earth metal salt of stearic acid, with the further proviso that the weight ratio of said alkali metal salt to said alkaline earth metal salt is 1:2 to 1:10, respectively.

References Cited by the Examiner

UNITED STATES PATENTS

| | | | |
|---|---|---|---|
| 2,705,227 | 3/1954 | Stamstoff | 260—45.75 |
| 2,790,734 | 4/1957 | Kuhn | 260—45.75 |
| 2,919,258 | 12/1959 | Pietrusza | 260—45.85 |
| 2,960,489 | 11/1960 | Gables | 260—45.75 |
| 3,008,908 | 11/1961 | Voight | 260—18 |
| 3,009,900 | 11/1961 | Hansen | 260—45.7 |
| 3,160,597 | 12/1964 | Costain | 260—45.7 |

FOREIGN PATENTS 722,724  1/1955  Great Britain.

LEON J. BERCOVITZ, *Primary Examiner.*

MILTON STERMAN, *Examiner.*